US006458443B2

(12) United States Patent
Collier et al.

(10) Patent No.: US 6,458,443 B2
(45) Date of Patent: *Oct. 1, 2002

(54) COMPOSITIONS AND METHODS FOR IMPARTING STAIN RESISTANCE

(75) Inventors: Robert B. Collier, Cohutta, GA (US); J. Todd Mull, Ringgold, GA (US)

(73) Assignee: Arrow Engineering, Inc., Dalton, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,980

(22) Filed: Jul. 24, 1998

Related U.S. Application Data

(60) Provisional application No. 60/078,198, filed on Mar. 16, 1998.

(51) Int. Cl.$^7$ .................. C09D 161/10; C09D 167/02; D06B 1/00
(52) U.S. Cl. ................... 428/96; 428/365; 428/378; 428/395; 427/389.9; 427/393.5; 8/115.6; 524/539; 524/541; 524/595; 524/596; 525/176; 525/133; 525/442
(58) Field of Search .................... 525/442, 133; 524/539, 541, 595, 596; 428/96, 365, 378, 395; 427/389.9, 393.5; 8/115.6

(56) References Cited

U.S. PATENT DOCUMENTS

| | | | |
|---|---|---|---|
| 3,949,124 A | * | 4/1976 | Jilla |
| 3,959,230 A | | 5/1976 | Hays |
| 4,027,346 A | | 6/1977 | Wada et al. |
| 4,569,772 A | | 2/1986 | Ciallella |
| 4,592,940 A | * | 6/1986 | Blyth et al. |
| 4,699,812 A | * | 10/1987 | Munk et al. |
| 4,822,373 A | | 4/1989 | Olson et al. |
| 4,839,212 A | | 6/1989 | Blyth et al. |
| 4,908,039 A | | 3/1990 | Holland et al. |
| 4,937,123 A | | 6/1990 | Chang et al. |
| 4,940,757 A | * | 7/1990 | Moss, III et al. |
| 4,959,248 A | | 9/1990 | Oxenrider et al. |
| 4,977,191 A | | 12/1990 | Salsman |
| 5,110,317 A | * | 5/1992 | Hangey et al. |
| 5,234,753 A | | 8/1993 | Williams, Jr. |
| 5,358,769 A | | 10/1994 | Pechhold |
| 5,516,337 A | | 5/1996 | Nguyen |
| 5,573,553 A | * | 11/1996 | McBride et al. |

OTHER PUBLICATIONS

AATCC Test Method 175–1993, AATCC Technical Manual pp. 312–313 (1993).*
Fallenstein, *Foam Application of Flurocarbons and Stain Resists,* AATCC Symposium, Carpet Dyeing: the Total Picture, May 29–30, 1991.*
Perkins, *A Review of Textile Dying Process,* AATCC Journal, pp. 23–27 (Aug. 1991).*
Slade, Handbook of Fiber Finish Technology, pp. 422–423 (1988).*
*Phenolic Resins,* Concise Encyclopedia of Chemical Technology, Wiley Interscience Publication, 3$^{rd}$ ed. pp. 867–868 (1985).*

* cited by examiner

*Primary Examiner*—Patricia A. Short
(74) *Attorney, Agent, or Firm*—Needle & Rosenberg, P.C.

(57) ABSTRACT

The invention concerns a stain resist composition comprising: (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof and (5) a (meth) acrylic polymer comprising residues of acrylic or methacrylic acid; and (b) a polyester.

31 Claims, No Drawings

COMPOSITIONS AND METHODS FOR IMPARTING STAIN RESISTANCE

CROSS REFERENCE TO RELATED APPLICATIONS

This application claims priority to U.S. provisional application Ser. No. 60/078,198, filed Mar. 16, 1998, and the 60/078,198 application is herein incorporated by this reference in its entirety.

FIELD OF THE INVENTION

The present invention relates to methods and compositions for imparting stain resistance to a substrate. Substrates that may be treated with the methods and compositions of the invention preferably include fibers containing free amino groups, including, but not limited to, polyamide fibers. The processes and compositions of the invention provide the substrate with stain resistance and good photo stability, which prevents yellowing.

BACKGROUND OF THE INVENTION

Materials and substrates containing free amino groups are subject to stain by certain natural and artificial colorants found in foods and other consumer products. The addition of stain resistant characteristics to substrates containing free amino groups provides a more desirable end product for the consumer.

Substrates, including fibers containing free amino groups, such as polyamide fibers, can be made stain resistant to certain stains by contacting the substrate with a solution containing an anionically modified phenol formaldehyde polymer, phenol sulfonates and their derivatives, naphthalene condensates, or blends of these materials. It is also known to blend these materials with polyether polymers, vinyls, polycarbonate polymers, and ethylene polymers.

One method of imparting stain resistance to fibers containing free amino groups is disclosed in U.S. Pat. No. 4,699,812 (Munk et al.). U.S. Pat. No. 4,699,812 discloses a process for imparting stain resistance in which a solution of aliphatic sulfonic acid is applied to the fibers, which are then dried.

U.S. Pat. No. 4,592,940 (Blyth et al.) discloses a process for imparting stain resistance to nylon fibers, in which the fibers are treated with the condensation products of formaldehyde and a mixture of diphenolsulfone and phenolsulfonic acid. The substrate is treated by immersing the carpet in the boiling treatment solution at a pH of 4.5 or less.

U.S. Pat. No. 4,822,373 (Olson et al.) discloses a process for treating polyamide materials in which a fibrous polyamide substrate is treated with a combination of (a) a partially sulfonated phenol formaldehyde polymer and (b) polymethacrylic acid, copolymers of methacrylic acid, or combinations of polymethacrylic acid and copolymers of methacrylic acid. The solution is generally applied as an aqueous solution at a pH below about 7.

U.S. Pat. No. 4,940,757 (Moss, III et al.) discloses a stain resistant polymeric composition for fibers having polyamide linkages. The composition is prepared by polymerizing an α-substituted acrylic acid in the presence of a sulfonated aromatic condensation polymer. The composition is applied to the substrate via flood, spray, foam methods, etc.

Additionally, U.S. Pat. No. 3,949,124 (Jilla) discloses a method and composition of imparting soil-repellency and antistatic properties. The reference discloses the pretreatment of a substrate with a material containing the condensation products of formaldehyde and another component chosen from a wide variety and long list, some of which are sulfonated phenol, diaryl sulfone, urea, melamine and dicayndiamide, followed by heat treatment and application of a separate composition containing, as one ingredient, a water-dispersible polyester and amino polymer followed by another heat treatment. U.S. Pat. No. 3,949,124 concerns imparting antistatic and antisoiling properties, which are distinct from stain resistance.

Those skilled in the art recognize that while anionically modified phenol formaldehyde polymers, napthalene condensates, lignin sulfonates and phenol sulfonate derivatives provide stainblocking, their photo instability causes yellowing of the dyed substrate over time. Therefore, there exists a need for compositions and methods that provide excellent stain resistance, while at the same time exhibiting reduced photo instability, i.e. reduced yellowing.

SUMMARY OF THE INVENTION

The present invention solves these problems, and provides further surprising properties. These and further objects of the invention will be more readily appreciated when considering the following disclosure and appended claims.

The present invention concerns a composition for imparting stain resistance to a substrate comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth)acrylic polymer comprising residues of acrylic or methacrylic acid; and (b) a polyester.

The invention further concerns a method of treating a substrate for stain resistance comprising applying to the substrate an aqueous solution or dispersion comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth) acrylic polymer comprising residues of acrylic or methacrylic acid; (b) a polyester; and (c) water.

The invention further concerns a method of treating a substrate for stain resistance comprising treating the substrate with a stain resist composition comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth) acrylic polymer comprising residues of acrylic of methacrylic acid; and (b) a polyester.

The invention also includes articles treated with the composition, and articles made using treated substrates. In a preferred embodiment, the articles include, but are not limited to, fibers having polyamide groups.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstances may or may not occur, and that the description included instances where said event or circumstance occurs and instances where it does not.

"Total weight", when used in reference to the stain resist composition, means the weight of the stain resist composition including components (a), (b) and any other components present in the stain resist composition.

Throughout this application, where publications are referenced, the disclosures of these publications in their entireties are hereby incorporated by reference into this application in order to more fully describe the state of the art to which this invention pertains.

The present invention concerns a composition for imparting stain resistance to a substrate comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth)acrylic polymer comprising residues of acrylic or methacrylic acid; and (b) a polyester.

The invention further concerns a method of treating a substrate for stain resistance comprising applying to the substrate an aqueous solution or dispersion comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth) acrylic polymer comprising residues of acrylic or methacrylic acid; (b) a polyester; and (c) water.

"A mixture thereof" as used herein in reference to component (a) means a mixture of one or more of components (1) through (4).

The invention further concerns a method of treating a substrate for stain resistance comprising treating the substrate with a stain resist composition comprising (a) a component selected from the group consisting of (1) an anionically modified phenol formaldehyde polymer comprising a phenol moiety and a formaldehyde moiety, (2) a naphthalene condensate, (3) a lignin sulfonate, (4) a phenol sulfonate derivative, a mixture thereof, and (5) a (meth) acrylic polymer comprising residues of acrylic of methacrylic acid; and (b) a polyester.

The invention also includes articles treated with the composition. In a preferred embodiment, the articles include, but are not limited to, fibers having polyamide groups.

"Stain resistance" may be quantitatively determined based on the AATCC Test Method 175-1993. Many production facilities, however, have modified this test to meet their own specific production requirements. The stain resistance may vary according to the end use of the substrate. In most uses, the substrate should have a stain resistance of at least 4 based on the AATCC Test Method, preferably at least 6, more preferably at least 7, and even more preferably 8 or higher, all based on the AATCC Test Method.

Those skilled in the art recognize that while anionically modified phenol formaldehyde polymers, napthalene condensates, lignin sulfonates and phenol sulfonate derivatives provide excellent stainblocking, their photo instability causes yellowing of the dyed substrate. The applicants have unexpectedly discovered that the combination of hydrophobic dispersible and/or water soluble polyester polymers and an anionically modified phenol formaldehyde polymer, naphthalene condensate, lignin sulfonate, phenol sulfonate derivative, or (meth)acrylic polymer, eliminates or substantially reduces the photo instability that causes the yellowing of the dyed substrate. Combining the anionically modified phenol formaldehyde polymers, naphthalene condensate, lignin sulfonate, phenol sulfonate derivate or methacrylic polymer having stain resist imparting properties, and a polyester, both hydrophobic dispersible and/or water soluble, produces a heretofore unrecognized synergistic effect.

The substrates treated with the compositions of the invention preferably include, but are not limited to, polyamide fibers or other synthetic fibers containing free amino groups, or the materials used to form the substrate or fibers. Fibers containing free amino groups may be obtained by a variety of methods, including but not limited to, the condensation reaction of hexamethylenediamine with adipic acid, hexamethylenediamine with sebacic acid, w-aminodecanoic acid, caprolactam and dodecylcaprolactam. Fibers formed from polyaryl amides, including type 6 and type 6.6 nylons, may be treated by the composition and method of this invention.

The treated fibers may be twisted, woven, tufted and sewn into various forms of textile materials including, but not limited to, rugs, carpets, and yarns. The fibers may be treated and then formed into the various forms of textile materials, or the formed textile may be treated.

The anionically modified phenol formaldehyde polymers appropriate for use in this invention include, but are not limited to, condensation products of aldehydes with phenyl bearing molecules and anionically modifying agents. The phenol formaldehyde polymer may be anionically modified by methods including, but not limited to, sulfonation, phosphonation and acylation. Sulfonation is preferred and is preferably accomplished using sulfonic acid. In one embodiment, the polymer contains phenylsulfonic acid residues. In other embodiments, the polymer may be a condensation product of naphtholsulfonic acid and an aldehyde, an anionically modified hydroxyaromatic formaldehyde condensate, the condensation product of anionically modified dihydroxydiphenylsulfone or the condensation product of naphtholsulfonic acid or the derivatives of any of these polymers.

Examples of other suitable anionically modified phenol formaldehyde polymers or compounded materials based on phenol formaldehyde polymers include, but are not limited to, FX 369, 668, 661 (3M), INTRATEX N (Crompton and Knowles), ERIONYL PA (Ciba-Geigy), NYLOFIXAN P and PM (formerly Sandoz, now Claraint), MESITOL NBS (formerly Mobay Chemical Corp., now Dystar, Inc.), ARROTEX 2035, 2077 (Arrow Engineering), CB-130 (Grifftex Corp.), etc. In an alternative embodiment, lignin sulfonates may be used in place of the anionically modified phenol formaldehdye polymer. In yet another embodiment, naphthalene condensates may be used in place of the anionically modified phenol formaldehyde polymer. In yet another embodiment, phenol sulphonate derivatives may be used in place of the anionically modified phenol formaldehyde polymer.

Compounds which are suitable for use as component (a) in this invention are disclosed in U.S. Pat. Nos. 4,592,940; 4,839,212; 4,822,373; 4,940,757; and EP 332342 A, equivalent to U.S. Pat. No. 4,937,123, which are herein incorporated by this reference in their entirety and for the teachings of suitable anionically modified phenol formaldehyde polymers. Sulfonated phenol formaldehyde polymer is the preferred anionically modified phenol formaldehyde polymer.

Dispersible and/or water soluble polyesters may be used in the invention. One suitable polyester for use in the composition is EVCOTE WR-2, disclosed in U.S. Pat. No. 4,977,191, a dispersible and or water soluble polyester product from EvCo Corporation.

The term "polyester," as used herein, refers to any unit-type of polyester falling within the scope of the polyester portion of the blend, including but not limited to homopolyesters, copolyesters (two or more types of acid or glycol residues of monomeric units) and terpolyesters. The polyesters of the present invention comprise an acid residue and a glycol residue. The acid residues of the polyesters of the present invention total 100 mol % and the glycol residues of the polyesters of the present invention total 100 mol %.

In one embodiment, water soluble or dispersible terephthalate based polyesters or copolyesters are used in the composition for imparting stain resistance. The terephthalate based polyester or copolyester may be recycled, as disclosed in U.S. Pat. No. 4,977,191, or virgin terephthalate polymers may be used. It is preferred that the acid residues of the copolyester comprise residues of terephthalic acid.

In another embodiment, a mixture of water dispersible and water soluble polyesters is present in the composition. Preferably, the water soluble and water dispersible polyesters comprise residues of terephthalic acid. The water dispersible polyester may be provided in the form of an emulsion.

The diol component of the polyester may comprise residues of a wide variety of diols, including, but not limited to, residues of ethylene glycol, diethylene glycol, triethylene glycol, cyclohexanedimethanol, propylene glycol, butylene glycol, neopentyl glycol, 1,5-pentanediol, 1,6 hexanediol or mixtures thereof The polyester preferably comprises residues of diethylene glycol, neopentyl glycol or mixtures thereof.

The polyester may comprise residues of polyoxyalkylene glycols derived from any polyol having three or more alcohol functions, including but not limited to glycerol, trimethylolpropane, pentaerythritol, erythritol, sorbitol, mannitol, other sugar alcohols or monosaccharides. The polyols can be oxyalkylated with an alkylene oxide, including, but not limited to, ethylene oxide, propylene oxide or a mixture thereof.

References proposing the use of polyesters containing terephthalate units and units derived from alkylene and polyoxyalkylene glycols for fiber or fabric treatment which are suitable for use in this invention include U.S. Pat. Nos. 3,959,230; 3,962,152; 4,027,346; 4,125,370; and U.S. Pat. No. 4,370,143.

The stain resist compositions of this invention comprise from 1% to 99% by weight of the stain resist composition, based on the total weight of the stain resist composition, of the anionically modified phenol formaldehyde polymer, naphthalene condensate, lignin sulphonate or phenol sulphonate derivative and from 1% to 99% of the polyester by weight of the stain resist composition, based on the total weight of the stain resist composition. Preferably, the stain resist composition contains an anionically modified phenol formaldehyde polymer, naphthalene condensate, lignin sulfonate or phenol sulphonate derivative at from 5% to 30% by weight of the total stain resist composition and a dispersible polyester varying at from 1% to 95% by weight of the total stain resist composition. More preferably, the polyester is a water dispersible polyester present at from 1 to 50% by weight of the total stain resist composition.

In another embodiment, another polymeric material comprising (meth)acrylic polymers, the (meth)acrylic polymers comprising residues of acrylic and/or methacrylic acid, may be used instead of the above-mentioned anionically modified phenol formaldehyde polymer, naphthalene condensate, lignin sulphonate etc. as component (a). It is preferred that component (a) comprise (meth)acrylic polymers. Preferably the (meth)acrylic polymer has a molecular weight of 1,500 to 30,000. It is further preferred that the (meth)acrylic polymer comprise methacrylic units, more preferably a homopolymer of methacrylic acid residues and having a preferable molecular weight of 1,500 to 30,000, more preferably 7,000 to 25,000, even more preferably 10,000 to 20,000. The combination of the polyester and acrylic/methacrylic polymers imparts both the desired stain resistance and reduced tendency to yellow by standard lightfastness test.

In addition, the (meth)acrylic polymer may comprise residues of other monomers having the vinyl grouping ($CH_2=CH-$). These monomers may be aliphatic vinyl monomers, aromatic vinyl monomers or mixtures thereof.

The preferred weight range of component (a) in the embodiment in which (meth)acrylic copolymer is selected is from 1% to 99% by weight of the total stain resist composition, more preferably from 1 to 66% by weight, even more preferably from 1 to 33% by weight of the total stain resist composition. The preferred weight ratio of the (meth)acrylic polymer to the polyester is from 1:1 to 1:6, by weight.

In addition to components (a) and (b), the stain resist composition may optionally contain etherified phenol formaldehyde condensates and/or acylated phenol-formaldehyde condensates.

In addition to components (a) and (b), the stain resist composition can include other ingredients, such other ingredients include, but are not limited to: water, anionic leveling agents, cross-linking agents, optical brighteners, chelating agents, and inorganic/organic salts, foaming agents, ultraviolet absorption, enhanced lightfastness, etc.

The compositions of the invention may be applied to the substrate in a variety of ways, including but not limited to contacting the substrate in the form of an aqueous medium or a dispersion, such as a foam, and alternatively applying the composition by spray application. Particular methods that may be used include, but are not limited to, Beck dyeing, Continuous Liquid and Foam dyeing, Flood, Flex Nip and Pad applications. The weight ratio of the aqueous medium or dispersion may vary between 0.5% to 500% based on the weight of the substrate. The weight ratio will vary dependent on the manner of application.

The prevailing plant conditions will also affect the amount of treatment composition necessary. The fiber type treated will also influence the application amount. For example, type 6 nylon historically requires application of more treatment composition than type 6.6 nylon.

Application conditions such as pH, temperature, steam and drying time can vary. The pH range for the aqueous medium (including the present composition) used in the contacting step should most effectively be between 0.5 and 10.0 for adequate stain resist. Preferably, the pH range is between 0.5 and 6.0. Most preferably, the pH range will be between 1.0 and 3.5. The temperature at which the fibers are contacted by the aqueous solution may range from ambient to temperatures up to 100° C. at atmospheric pressure and above 100° C. under pressure conditions (closed atmosphere).

Where production procedures warrant, steam aids in the efficacy of the stain resist product when applied by, but not limited to Beck, Continuous liquid, Flood and Pad applications. The steam time may vary from 15 seconds to 10 minutes, the preferred time being from 2 minutes to 8 minutes. In certain applications but not limited to Flex Nip and Foam Application, drying with forced heat aids in cross-linking and the subsequent fixing of the stain resist material. In one embodiment, the substrate is dried with forced air. In another embodiment, the substrate is dried with microwave heat. The drying time is dependent upon varying conditions predicated by moisture content, range speed, type construction, the weight of the substrate, etc. The drying time may vary from 30 seconds to 15 minutes.

In a preferred embodiment, the application reaction and formulation are performed with the conditions of a pH range of 10 or below, in a temperature range from about 25° C. to temperatures at 100° C. or above 100° C. under pressure conditions and steamed and/or dried for 15 seconds to 10 minutes to impart the desired characteristics and degree of stain resistance.

In another embodiment, the stain resist composition may be contacted or applied to the substrate neat. In yet another embodiment, the stain resist composition may be used to treat the substrate by coextruding the stain resist composition with the substrate. Thus, the stain resist composition can be applied as a post-treatment to the already produced substrate or it can be applied during the process of making the substrate, such as, for example, co-extruding the stain resist with the fiber resin.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in °C. or is at room temperature and pressure is at or near atmospheric.

The following Examples show that polyesters, including EVCOTE WR-2, a water dispersible polyester, manufactured by EvCo, may be blended with stain resist imparting compounds to achieve the desired stain resistance to FD&C Red 40 (contained in KOOL-AID), coffee, tea, etc. A further embodiment is the combining of a hydrophobic dispersible and/or water soluble polyester polymer with a polymeric material based on acrylic and/or methacrylic monomer/polymer such that the desired stain resistance and acceptable lightfastness properties are achieved (Example 4). Most noteworthy in this embodiment is the elimination of the phenol-formaldehyde component which has historically been the major contributor to lightfastness failure both in laboratory, showroom and "in situ" circumstances.

The following Examples demonstrate that certain polyester dispersions may be blended with the anionically modified phenol formaldehyde polymer and polymeric materials based on acrylic and/or methacrylic monomers such that successful stainblocking with minimal yellowing may be achieved Example 1

In this example, the substrate, nylon type 6 superba, a fiber, was treated using 1.8%, based on the weight of the substrate (owg), of stainblocker foamed on using 5 g/l of Arrofoam 2273 at 30% wet pickup at a pH of 3.5. The treated substrate was cured by steaming for one minute and then the substrate dried. The effectiveness of the stainblocker was checked using sweetened cherry KOOL-AID at ambient temperature with 20 ml KOOL-AID liquid poured onto the surface of the carpet in a 23 cm diameter ring. The KOOL-AID was allowed to contact the surface of the carpet in a 23 cm diameter ring. The KOOL-AID was allowed to contact the surface of the carpet for one minute and then was cold water rinsed, dried and graded. The coffee stain test consisted of contacting 20 ml of 180 degree coffee placed into a 23 cm ring for one minute onto the surface of the test carpet. The sample was cold water rinsed, dried and rated. In addition to the cherry KOOL-AID test described below, AATCC Method 175 is also commonly used. This test method is based on FD&C Red 40. The rating scale used was 1–10 with 1 representing "much" stain and 10 representing "no" stain and the gradients between being proportional. The samples tested formulations and the results are listed below in Table 1:

Sample 1 Control (Untreated carpet)

Sample 2 XSB-1 (13.6% phenol formaldehyde condensate; 12% polyester dispersion; the balance primarily water)

Sample 3 XSB-2 (12.0% phenol-formaldehyde condensate; 12% polyester dispersion; 3% inorganic salt for ozone enhancement; the balance primarily water)

Sample 4 ARROTEX 2035 (12.3% phenol-formaldehyde condensate; 3% inorganic salt for lightfastness enhancement; the balance primarily water)

TABLE 1

| Sample | KOOL-AID | Coffee/Tea Stain |
|--------|----------|------------------|
| 1 | 2 | 2 |
| 2 | 8 | 8 |
| 3 | 8 | 8 |
| 4 | 7 | 6 |

Conclusion:

The results in Table 1 show that the addition of the polyester dispersion improves the stain resist qualities including the stain resist to coffee and tea stain.

Example 2

Conventionally, stain resist programs are run in conjunction with fluoropolymers which show enhanced stainblocking. The following results are based on the same testing procedures from Example #1 and all applications are the same except that fluoropolymer has been added to the foamed on mix at 1% based on the weight of the substrate Sample 5—Control-No treatment Sample 6—1% Fluoropolymer blend (38% of 30% fluoropolymer of a 10% fluorine; 8% polyester dispersion; the balance primarily water).

Sample 7—1% fluoropolymer blend as sample 3 and 1.8% XSB-1 (see Example 1).

TABLE 2

| Sample | KOOL-AID | Coffee/Tea Stain |
|---|---|---|
| 5 | 3 | 3 |
| 6 | 7 | 7 |
| 7 | 9 | 9 |

To one knowledgeable in the art, the addition of a fluoropolymer enhances stain resist to KOOL-AID and other common stain elements such as coffee and tea. Table 2 demonstrates the effect of these stains on untreated (control), fluoropolymer only treated (6) and fluoropolymer, phenol-formaldehyde, polyester dispersion (7) treated carpet samples.

Example 3

In this trial, a fluoropolymer consisting of 38% of a 30% of a 10% fluorine fluoropolymer was mixed with 8% polyester dispersion, 4% emulsifier and the balance water, and this product for this trial will be called "MIXBA"—and all references to this consist of the above formulation.

These trials were completed at a fiber producers laboratory using a modified Kuster Fluidyer for foam application of a liquor at 15% wet pick up. Each of the different fifteen liters of the liquor to be applied was prepared in the following manner. To the 15 liters of water, 5 g/l of Arrofoam 2273 was added, 1.8% based on the weight of the goods or 120 g/l mix of the stain resist (except sample #15) and 1% based on the weight of the goods or 66 g/l mix of fluoropolymer (MIXBA). The pH of the liquor in each case was adjusted to 3.5 using sulfamic acid. All samples were dried at 300 degrees F for 5 minutes, backed and then tested in the previously described manner.

Sample 8 MIXBA+XSB-10 (6.0% phenol-formaldehyde condensate; 12% polyester dispersion; balance primarily water).

Sample 9 MIXBA+XSB-11 (9% phenol-formaldehyde condensate; 12% polyester dispersion; balance primarily water).

Sample 10 MIXBA+XSB-12 (9% phenol-formaldehyde condensate; 24% polyester dispersion; balance water).

Sample 11 MIXBA+XSB-13 (6% phenol-formaldehyde condensate; 5.7% inorganic salt for lightfastness enhancement; balance primarily water).

Sample 12 MIXBA+XSB-14 (6% phenol formaldehyde condensate; 12% polyester dispersion; 5.7% inorganic salt for lightfastness enhancement; balance primarily water).

Sample 13 MIXBA only

Sample 14 MIXBA+XSB-16 (4% phenol-formaldehyde condensate; 24% polyester dispersion; 3.8% inorganic salt for lightfastness enhancement; balance primarily water).

Sample 15 MIXBA+XSB-17 (2.8% phenol-formaldehyde condensate; 24% polyester dispersion; 3.8% inorganic salt for lightfastness enhancement; balance primarily water).

Note: The below percentages apply to the aqueous material mixed for application to the carpet under the previously mentioned parameters.

The following liquid applies:

PF=Anionically Modified Phenol-formaldehyde condensate

PD=Polyester dispersion

LFE=Lightfastness enhancer

MIXBA=Fluoropolymer

TABLE 3

| Sample | PF | PD | LFE | KOOL-AID | Coffee/Tea Stain |
|---|---|---|---|---|---|
| 8 | 6 | 12 | 0 | 9 | 9 |
| 9 | 9 | 12 | 0 | 9 | 8 |
| 10 | 9 | 24 | 0 | 10 | 9 |
| 11 | 6 | 0 | 0 | 8 | 8 |
| 12 | 6 | 12 | 6 | 10 | 9 |
| 13 | 0 | 0 | 0 | 7 | 7 |
| 14 | 4 | 24 | 3.8 | 10 | 8 |
| 15 | 2.8 | 24 | 3.8 | 10 | 9 |

Observations:

In examining the comparison of the presence of phenol-formaldehyde (PF), polyester dispersion (PD), inorganic salt for lightfastness enhancement (LFE) and fluoropolymer (F), the following observations may be made. As the PF concentration increases and the polyester dispersion remains constant, the resistance to KOOL-AID remains the same but resistance to coffee/tea stain decreases (samples 8,9). If the polyester dispersion increases with the PF remaining the same, resistance to both stains increases (samples 9,10). The stain resist to KOOL-AID with out the polyester dispersion reduces in effectiveness (sample 11). The effect of the addition of all three components: PF, PD & LFE (sample 12) illustrate an improvement in stain resist to KOOL-AID as compared to sample 8. Sample 13 with only F and no PF, PD, nor LFE shows the lowest performance for both stain resist tests. Samples 14 and 15 represent a lower and decreasing PF level as compared to the previous samples and the PD is doubled compared to samples 8, 9 and 12. There is a measurable increase in stain resist due to the change. Note that the LFE is the same and does not appear to contribute nor detract from the stain resist results. In all cases in Example 3, the fluoropolymer (F) application remained the same.

Conclusions:

The combining of the standard phenol-formaldehyde stain resist with polyester dispersions clearly enhance and improve the stain resistance to KOOL-AID and coffee/tea stain when co-applied with a fluoropolymer.

Example 4

This trial demonstrates the effectiveness of a polyester dispersion as an acceptable stain resist material. The addition of an acrylic/methacrylic polymer enhances the stain resist properties and clearly demonstrates the enhancement to lightfastness. In addition to the stain resist properties to KOOL-AID and Coffee/Tea stain, resistance to lightfastness to nitrous oxide gases is included in this Example. (AATCC Trial Method 164—Effects of NO2 colorfastness).

The following combinations of products were applied as further described.

| Control | Untreated |
|---|---|
| 2A | XSB-2A + 2279 |
| 2B | XSB-2B + 2279 |
| 2C | FX668 + FX1367 |
| 2N | XSB-2N + 2279 |

-continued

| Control | Untreated |
|---------|-----------|
| 2T | XSB-2T + 2279 |
| 2W | XSB-2W + 2279 |

A different fluoropolymer, ARROTEX 2279, a blend consisting of a sulfonated nonylphenol, fluoropolymer(s) and water, was applied.

| | |
|---|---|
| ARROTEX 2279 | (31% of a 30% fluoropolymer of a 10% fluorine; 3.5% emulsifier; the balance primarily water). |
| 2A XSB-2A | (12.35% inorganic salt used for lightfastness enhancement; 15.4% methacrylic polymer; 30% polyester dispersion; the balance primarily water). |
| 2B XSB-2B | (5.3% inorganic salt used for lightfastness enhancement; 6.6% methacrylic polymer; 70% polyester dispersion; the balance primarily water). |
| 2C FX668 | (phenol-formaldehyde condensate blended with methacrylic acid polymer as described in patent #4822373 (Minnesota Mining and Mfg. Co.). |
| FX1367 | (Fluoropolymer commonly used in co-application with FX668 to obtain stain resist and acceptable NOX testing results). |
| 2N XSB-2N | (7.7% Naphthalene condensate; 40% polyester dispersion). |
| 2T XSB-2T | (10% naphthalene condensate; 40% polyester dispersion). |
| 2W XSB-2W | (30% polyester dispersion; The balance primarily water). |

These trials were completed at a fiber producers laboratory using a modified Kuster Fluidyer for foam application of a liquor at 15% wet pick up. Each of the different fifteen liters of the liquor to be applied was prepared in the following manner. To the 15 liters of water, 5 g/l of ARROFOAM 2273 was added, 1.8% based on the weight of the goods or 120 mg/l mix of the stain resist (except sample #15) and 0.9% based on the weight of the goods or 60 g/l mix of fluoropolymer (MIXBA). The pH of the liquor in each case was adjusted to 3.5 using sulfamic acid. All samples were dried at 300 degrees F for 5 minutes, backed and then tested in the previously described manner.

PF=Anionically Modified Phenol formaldehyde
LFE=Lightfastness enhancer
M/ACR=Methyl/methacrylic polymer
PD=Polyester dispersion
NAPH=Naphthalene condensate

TABLE 4

| Control | PF | LFE | M/ACR | PD | NAPH | KOOL-AID | Coffee/Tea Stain |
|---------|----|----|-------|----|------|----------|------------------|
| 2A | 0 | 12.35 | 15.4 | 30 | 0 | 7 | 7 |
| 2B | 0 | 5.3 | 6.6 | 70 | 0 | 8 | 8 |
| 2C | Note: see below | | | | | 8 | 7 |
| 2N | 0 | 0 | 0 | 40 | 7.7 | 7 | 8 |
| 2T | 0 | 0 | 0 | 40 | 10 | 7 | 8 |
| 2W | 0 | 0 | 0 | 30 | 0 | 8 | 8 |

Note: Sample 2C is a combination of FX668 and FX1367. The two products are commonly used in the market place and sold as the "hang-tag" program marketed as Scotchgard/Stainrelease. This combination illustrates a combination of a stain resist compound co-applied with a fluoropolymer. This represents the art as known to those knowledgeable in the industry and demonstrates the basis of several of the trials herein.

The results of Example 4, as shown in Table 4, show that a combination of lightfastness enhancers, methyl/methacrylic polymer and polyester dispersion blend gives both KOOL-AID and coffee/tea stain resistance equivalent or better than sample 2C, a commonly referred to standard in the industry.

TABLE 5

| | NOX | | | | | | | |
|---|---|---|---|---|---|---|---|---|
| | 1 | 2 | 3 | 4 | 5 | 6 | 7 | 8 |
| Control | 4–5 | 4 | 4 | 3–4 | 3–4 | 3 | — | — |
| 2A | 4–5 | 4–5 | 4–5 | 4–5 | 4 | 4 | 3–4 | 3–4 |
| 2B | 4–5 | 4–5 | 4–5 | 4–5 | 4 | 4 | 3–4 | 3–4 |
| 2C | 3–4 | 3–4 | 3 | 2–3 | — | — | — | — |
| 2N | 1–2 | — | — | — | — | — | — | — |
| 2T | 1–2 | — | — | — | — | — | — | — |
| 2W | 4–5 | 4 | 3–4 | 3 | 3 | 3 | — | — |

In addition, a requisite in many cases is resistance to photo yellowing. Table 5 is based on the parameters from Example #4 production procedures and the standard AATCC. Trial method 164 illustrates this increased performance. Eight (8) cycles of NOX testing, while extremely stringent, is required by one of the major fiber producers in order to meet their labeled programs.

The control with no topical treatment minimally passed into the $6^{th}$ cycle. Sample 2C, a common "industry standard" minimally passed into the $4^{th}$ cycle and failed. Samples 2A and 2B are to be especially noted. As disclosed from the formulation, they contain no phenol-formaldehyde the most common stain resist component (other than fluoropolymer) applied in the industry. This is significant in that truly significant reduction or elimination of yellowing to an acceptable level has been almost impossible. The combination of the polyester dispersion and acrylic/methacrylic polymers imparts both the desired stain resistance and reduced tendency to yellow by standard lightfastness test.

Example 5

With the synergistic effect from the combination of the two polymers observed, work was done to establish whether the two polymers were cross-linking or whether there was only interstitial commingling of the two polymer chains. Previous work with other polymeric systems as disclosed U.S. Pat. No. 4,940,757 indicate improved performance when using the polymeric product prepared by polymerizing an alpha-substituted acrylic acid or ester in the presence of an anionically modified aromatic formaldehyde condensation polymer.

An experiment was set up to determine if cross-linking between the two polymer chains was occurring under the conditions of application of the polymer mixture. According to previous work done by EvCo Research, the EVCOTE WR series will cross-link alone using only heat. The rate of self-cross linking of the EVCOTE WR polymer is said to be dependent upon the temperature and time held at a specified temperature.

Experiment

Step 1: A 25% solids EVCOTE WR polymer was dried to a film under low temperature conditions.

Step 2: Two to three grams of the sample film were carefully weighed and extracted using a paper filter bag and 600 ml. of a dilute ammonium hydroxide solution at a pH of 7.5–8.0 held at 90–95 degrees Centigrade for one hour.

These conditions were set forth by EvCo Research as necessary for the redispersion of films of the EVCOTE WR polymer.

Step 3: The extracted samples were dried in the oven until bone dry and then carefully weighed to determine what percent of the original film remained insoluble, an indication of the percent cross-linking that occurred.

The above experiment was repeated except the dried film in Step 1 was further cured in a convection oven for 5 minutes and 130 degrees Centigrade before weighing. Such conditions were set to emulate the conditions during application to the carpet fiber. These values would serve as a control and a baseline for values obtained with combinations of the EvCo and Phenol formaldehyde polymers.

The above experiment was repeated using a 25% dispersion of EVCOTE WR mixed at various ratios with a 25% dispersion of the anionically modified polymer. These films were also cured in a convection oven for 5 minutes and 130 degrees Centigrade to emulate application conditions.

TABLE 6

| Results Sample | Ratio of EVCOTE WR to Anionically Modified Phenol formaldehyde copolymer | Percent Cross Linked* |
| --- | --- | --- |
| 16** | 1:0 = no Phenol formaldehyde copolymer | 0.4 |
| 17 | 1:0 = no Phenol formaldehyde copolymer | 38.7 |
| 18 | 1:1 | 10.5 |
| 19 | 2:1 | 26.5 |
| 20 | 3:1 | 65.9 |
| 21 | 4:1 | 70.8 |
| 22 | 6:1 | 72.7 |
| 23 | 8:1 | 49.8 |

*Percent Cross linked = Weight of dried polymer after extraction/original weight of polymer film.
**This was only sample not cured.

Conclusions

1. The extraction conditions were sufficient to resolubilize the EVCOTE WR polymer as evident by the low Percent Cross linked value of Sample 16.

2. Under the curing used to emulate the conditions during application to the carpet fiber the EVCOTE WR will cross link alone as evident by the 38.7 Percent Cross Linked value of Sample 17.

3. Large amounts of the Phenol formaldehyde copolymer polymer may actually inhibit cross linking as evident by Sample 18 which should have been at least 20% if only EVCOTE WR was cross linking.

4. Combinations of EVCOTE WR and Phenol formaldehyde copolymer in ratios of 3:1 , 4:1 and 6:1 have an increased Cross Linked Percent under the curing conditions set to emulate application to carpet.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A stain resist composition comprising
   (a) an anionically modified phenol formaldehyde polymer comprising a phenol moiety and a formaldehyde moiety, and;
   (b) a polyester.

2. The stain resist composition of claim 1, wherein the polyester comprises a water soluble polyester.

3. The stain resist composition of claim 2, wherein the water soluble polyester comprises monomeric residues of terephthalic acid.

4. The stain resist composition of claim 1, wherein the polyester comprises a water dispersible polyester.

5. The stain resist composition of claim 4, wherein the water dispersible polyester comprises monomeric residues of terephthalic acid.

6. The stain resist composition of claim 4, wherein the water dispersible polyester comprises from 1 to 95% by weight of the total stain resist composition.

7. The stain resist composition of claim 1, wherein the polyester component comprises a mixture of a water dispersible polyester and a water soluble polyester, wherein the water dispersible and the water soluble polyesters independently comprise monomeric residues of terephthalic acid.

8. The stain resist composition of claim 1, wherein component (a) is from about 1 to about 99% by weight of the total stain resist composition, and the polyester component comprises from about 1 to about 99% by weight of the total stain resist composition.

9. The stain resist composition of claim 1, wherein component (a) is from about 5 to about 30% by weight of the total stain resist composition.

10. The stain resist composition of claim 9, wherein the polyester component is a water dispersible polyester comprising from about 1 to about 50% by weight of the total stain resist composition.

11. The stain resist composition of claim 1, further comprising an ingredient selected from the group consisting of an anionic leveling agent, cross-linking agent, optical brightener, chelating agent, inorganic salt, organic salt, foaming agent and mixture thereof.

12. The stain resist composition of claim 1, wherein the phenol portion of the anionically modified phenol formaldehyde polymer comprises sulfonated dihydroxydiphenylsulfone.

13. The stain resist composition of claim 1, wherein component (a) comprises phenylsulfonic acid residues.

14. The stain resist composition of claim 1, wherein component (a) comprises anionically modified hydroxyaromatic formaldehyde condensates.

15. The stain resist composition of claim 1, wherein the stain resist composition further comprises etherified phenol formaldehyde condensates.

16. The stain resist composition of claim 1, wherein the stain resist composition further comprises acylated phenol formaldehyde condensates.

17. The stain resist composition of claim 1, wherein the stain resist composition further comprises a fluoropolymer.

18. The stain resist composition of claim 1, further comprising water.

19. An article treated with the composition of claim 1.

20. The article of claim 19 comprising a carpet.

21. A method of treating a substrate for stain resistance comprising applying to the substrate a composition comprising:
   (a) an anionically modified phenol formaldehyde polymer comprising a phenol moiety and a formaldehyde moiety; and
   (b) a polyester.

22. The method of claim 21, wherein the composition is applied is an amount of 0.5 to 500%, based on the weight of the substrate.

23. The method of claim 21, wherein the composition comprises water.

24. The method of claim 21, further comprising the step of applying dry heat to the substrate after the application of the composition.

25. The method of claim 21, wherein the composition is applied at a temperature of between ambient and 300°F.

26. The method of claim 21, wherein the pH of the composition 0.5 to 10.0.

27. The method of claim 21, further comprising the step of applying steam to the substrate after application of the composition for from about 15 seconds to about 10 minutes.

28. The method of claim 21, further comprising the step of drying the substrate for from about 30 seconds to about 15 minutes.

29. The method of claim 21, wherein the composition is applied in the form of a foam.

30. The method of claim 21, wherein the substrate is selected from the group consisting of carpet fibers and yarn.

31. The method of claim 21, wherein the substrate comprises a polyamide.

* * * * *